(12) United States Patent
Duensing et al.

(10) Patent No.: US 6,444,243 B1
(45) Date of Patent: Sep. 3, 2002

(54) RAWHIDE ANIMAL CHEW AND METHOD FOR PRODUCING SAME

(75) Inventors: Steven Duensing, Chicago Heights; John Kukan, Lisle; Jaime G. Lopez, Elgin, all of IL (US)

(73) Assignee: PetAg, Inc., Hampshire, IL (US)

( * ) Notice: Subject to any disclaimer, the term of this patent is extended or adjusted under 35 U.S.C. 154(b) by 0 days.

(21) Appl. No.: 09/648,030

(22) Filed: Aug. 25, 2000

(51) Int. Cl.[7] .......................... A23K 1/18; A01K 29/00
(52) U.S. Cl. .................. 426/132; 426/281; 426/302; 426/512; 426/520; 426/805
(58) Field of Search ................. 426/132, 302, 426/512, 805, 520, 281

(56) References Cited

U.S. PATENT DOCUMENTS

| | | | | |
|---|---|---|---|---|
| 3,871,334 A | * | 3/1975 | Axelrod | 119/29.5 |
| 4,145,447 A | * | 3/1979 | Fisher et al. | 426/72 |
| 4,771,733 A | * | 9/1988 | Axelrod | 119/29.5 |
| 4,818,550 A | | 4/1989 | Davidson | 426/281 |
| 5,004,618 A | | 4/1991 | Buckholz, Jr. et al. | 426/281 |
| 5,057,332 A | | 10/1991 | Davidson et al. | 426/281 |
| 5,084,286 A | | 1/1992 | Moody | 426/281 |
| 5,100,651 A | * | 3/1992 | Boyer | 424/52 |
| 5,158,794 A | | 10/1992 | Halden et al. | 426/281 |
| 5,980,963 A | | 11/1999 | Bazan | 426/281 |
| 6,040,013 A | * | 3/2000 | Karales | 427/281 |
| 6,042,873 A | * | 3/2000 | Lawson | 426/657 |
| 6,165,474 A | * | 12/2000 | Frudakis et al. | 424/195.1 |

OTHER PUBLICATIONS

Meat Processing, p. 26, Jul. 1994.*
Internet brochure pages of Hollymatic Corporation, Dec. 29, 1999, (2 pages), USA.
Internet brochure page of Hollymatic Corporation's *Hollymatic HVT–30*, Dec. 29, 1999, (1 page).
Internet brochure page for Hollymatic Corporation's *Hollymatic Vacuum Tumblers* (200, 300, and 500 ib. Capacities), Dec. 29, 1999, (1 pages), USA'.
Internet brochure pages for Hollymatic Corporation's Holly Mini–Matic (Ergonymic Mixer–Grinder); and Hollymatic 200, 200, and 500 lb. Vacuum Tunblers, Dec. 29, 1999, (1 page), USA.

* cited by examiner

*Primary Examiner*—Chhaya D. Sayala
(74) *Attorney, Agent, or Firm*—Robert E. Browne; Michael G. Kelber

(57) ABSTRACT

The invention provides a process for producing a rawhide chew toy, comprising: combining a marinade with rawhide; applying vacuum pressure to the combined marinade and rawhide; releasing the vacuum pressure; and allowing the formed rawhide to dry under moderate temperature. In one embodiment, the combined marinade and rawhide are tumbled during the step of applying vacuum pressure. In additional embodiments of the invention, nutrients, such as, vitamins, minerals, dental additives, or herbal remedies, may be added to the marinade.

20 Claims, 1 Drawing Sheet

RAWHIDE ANIMAL CHEW AND METHOD FOR PRODUCING SAME

FIELD OF THE INVENTION

The present invention relates generally to a chew toy for animals. Specifically, the invention relates to a process for making rawhide chew toys.

BACKGROUND OF THE INVENTION

Conventional rawhide chew toys come in various shapes and sizes, for example: bones, rolls, donuts, pretzels, sticks, chips, munchie, and ground-and-pressed products. A process for making conventional rawhide chew toys is described, for example, in U.S. Pat. No. 2,988,045 issued to Fisher on Jun. 13, 1961. As described by Fisher, conventional rawhide chew toys are made from processed animal skins. The animal skins are de-haired and cleaned, leaving "wet rawhide." This wet rawhide may be formed into shapes, if desired, and then dried, upon which the chew toy becomes hard and bone-like.

Rawhide chew toy manufacturers have traditionally applied various flavors and coatings topically to dried rawhide to attract the animal to the rawhide chew toy. Coatings or bastings are applied to the surface of the dried rawhide by spraying a solution on the dried rawhide or by dipping the dried rawhide in the solution. Such coatings are described, for example, in U.S. Pat. No. 5,673,653 issued to Sherrill on Oct. 7, 1997 (see Col. 1, lines 55–59).

A problem with these conventional rawhide chew toys is that after the coating is licked off the rawhide chew toy, there is less incentive for the animal to continue chewing and the animal frequently loses interest in the rawhide chew toy. As a result, the animal owner may discard the chew toy before it is completely chewed and buy a new chew toy that still has the flavoring applied to the surface of the dried rawhide. In addition, coatings applied to the surface of the dried rawhide are easily rubbed off causing stains on carpet, etc. Further, any nutrients added to the solution and applied to the surface of the dried rawhide will not remain in the rawhide during the chewing process.

As a result of these and other drawbacks to the prior art, there is a need in the industry for an improved rawhide chew toy that will retain flavoring during various phases of being chewed, provide a vehicle for delivering nutrients to animals, and is less likely to create stains upon being chewed by an animal.

SUMMARY OF THE INVENTION

An object of the invention is to provide a process for producing a rawhide chew toy, comprising combining a marinade with wet rawhide; applying vacuum pressure to the combined marinade and wet rawhide; releasing the vacuum pressure; and drying the marinated rawhide.

In a further aspect of the invention, the vacuum pressure applied to the combined marinade and wet rawhide is between 5 and 25 in. Hg.

In a further aspect of the invention, the combined marinade and wet rawhide are tumbled during the step of applying vacuum pressure.

In another aspect of the invention, nutrients, such as, vitamins, minerals, dental additives, or herbal remedies may be added to the marinade.

DETAILED DESCRIPTION OF THE INVENTION

Figure 1:
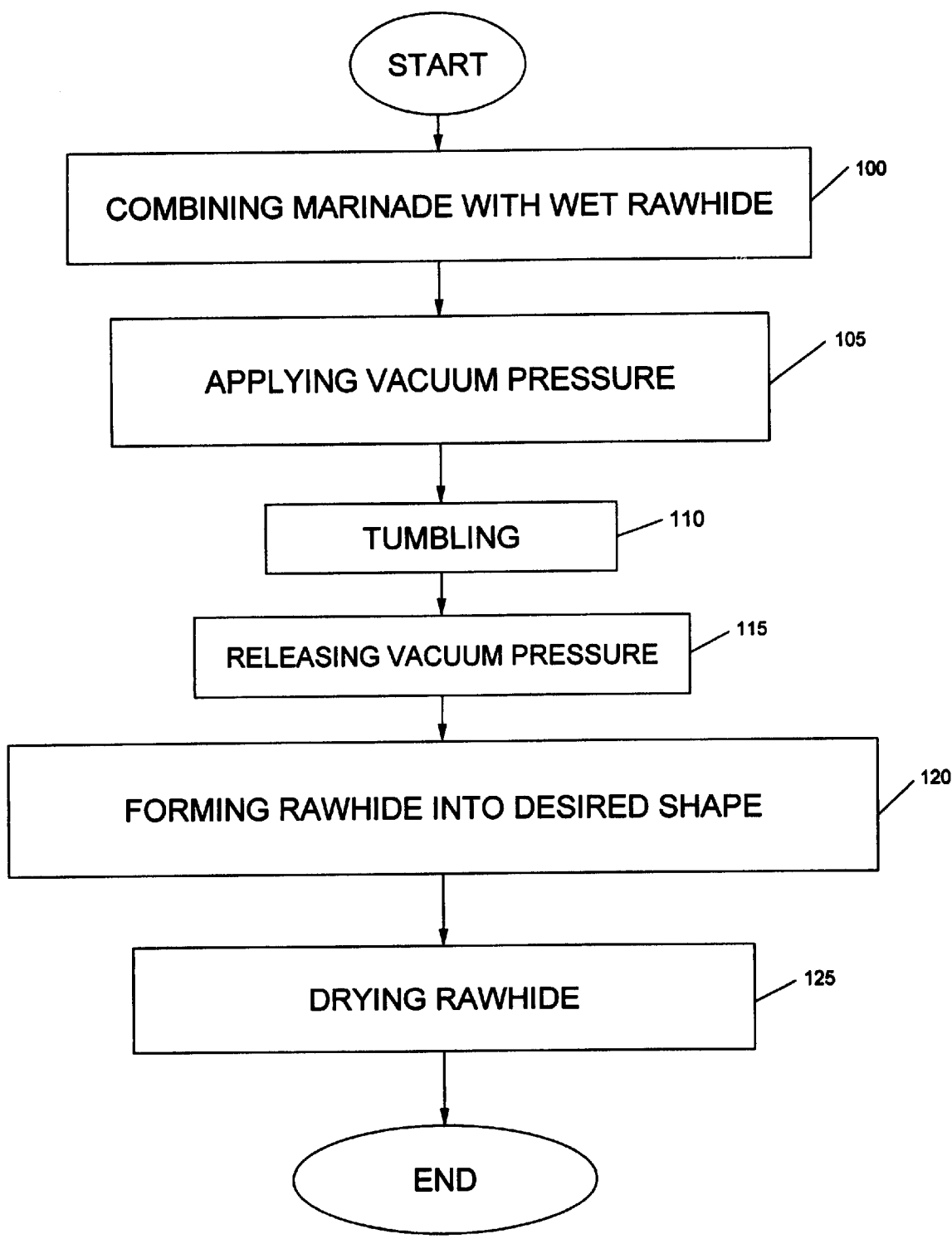
FIG. 1 is a flowchart illustrating the steps performed to produce a rawhide animal chew in accordance with an aspect of the present invention.

FIG. 1 is a flowchart illustrating the steps performed to produce a rawhide animal chew in accordance with an aspect of the present invention. Rawhide is comprised of connective collagen fibers. It has been discovered that when wet rawhide is subjected to vacuum pressure (air pressure below atmosphere pressure also referred to herein as negative atmospheric pressure) the fibers swell to between approximately two to three times their normal size. This swelling action opens the fibers, which can then receive a solution of marinade throughout.

The marinade and wet rawhide are combined in a drum at step 100. The absorption of the marinade into the fibers is aided by applying vacuum pressure at step 105 to the combined marinade and wet rawhide. In other embodiments, the absorption of the marinade is aided by tumbling the wet rawhide together with the marinade at step 110. This tumbling action forces the marinade throughout the fibers. In further embodiments, the vacuum pressure can be combined with a tumbling action. When tumbling is complete and the vacuum pressure is released at step 115, the marinated rawhide contracts to approximately its original size and is believed to trap the marinade throughout the rawhide.

In one embodiment the chew toy is created by using wet rawhide that is cut into strips. At step 120, the wet strips of marinated rawhide are formed into various shapes and sizes as listed above and allowed to dry and harden at step 125. In another embodiment, the wet strips of marinated rawhide are dried at step 125 by placing them into a drying oven until a moisture level below approximately 12% is achieved. A moisture-content of less than or equal to approximately 12% is known in the art to prevent rotting, mold, or other spoilage of the chew toy.

Various additives may be mixed with the marinade, including the following examples:

1) Vitamins
   | | | |
   |---|---|---|
   | Vitamin A | Vitamin D | Vitamin E |
   | Vitamin K | Thiamin (B1) | Riboflavin (B2) |
   | Niacin | Pyridoxine (B6) | Panthothenic Acid |
   | Biotin | Folic Acid | Vitamin B12 |
   | Choline | Vitamin C (Ascorbic Acid) | |

2) Minerals
   | | | |
   |---|---|---|
   | Calcium | Phosphorus | Zinc |
   | Magnesium | Manganese | Iron |
   | Copper | Sodium | Potassium |
   | Chloride | Iodine | Sulphur |

3) Dental additives
   Glucosoxidase Lactoperoxidase (for Tartar build up)
   Copper Chlorophyllin (for bad breath control)

4) Herbal Remedies
   | | | |
   |---|---|---|
   | Echinacea | Guarana | Chamomile |
   | Gingko Biloba | St. John's Wort | Kava Kava |
   | Valerian Root | Aloe Vera | Goldenseal |
   | Fenugreek | | |

5) Spices/flavors
   | | |
   |---|---|
   | Garlic | Capcicum sp. Allspice |
   | Clove | Kelp |

6) Oils
   | | | |
   |---|---|---|
   | Lecithin | Primrose Oil | Tea Tree Oil |
   | Flaxseed Oil | Borage Oil | Soybean Oil |
   | Sunflower Oil | Fish Oils | Peppermint Oil |

These additives attract the animal as well as aid the health and well-being of the animal. The marinated rawhide has the flavor and/or additives impregnated throughout the rawhide and the flavor will last as the animal chews the marinated rawhide chew toy.

One embodiment of the process includes the following steps. At step 100, one or more cut, wet rawhide strips are placed into a sealable container, such as a drum of a vacuum tumbler, together with a formulated marinade solution. The formulation for the marinade used in one embodiment is described below under the Examples. At step 105, the drum is sealed and negative atmospheric pressure is applied for a specified time. After expiration of the specified time, some commercial vacuum tumblers then require that a vacuum tube be disconnected. In a preferred embodiment, in steps 105 and 110, a timer is set to tumble the drum and apply a vacuum for a specified time, as provided in the Examples below. After expiration of the specified tumble and vacuum time, the valve is opened to equalize pressure in the drum at step 115.

To remove the marinated rawhide strips, the drum can be agitated to dump the marinated rawhide into a basket under the drum. Any excess marinade can be re-used for a later batch. Upon removal of the marinated rawhide strips from the drum, the marinated rawhide strips are allowed to drain, for example, by setting them on a rack for a specified amount of time. Then the marinated rawhide strips may be formed into desired shapes and allowed to dry at step 125, for example by baking, until less than approximately 12% moisture is retained by the rawhide.

The following is one Example of a formulation for a marinade solution:

| TOTAL MARINADE SOLUTION | |
|---|---|
| INGREDIENT | QUANTITY |
| Vitamin Premix | 250 gm |
| M100 (Maltodextrin) | 2 lbs |
| Citric Acid | 10 gm |
| Purified Water | 83.30 lbs |
| TOTAL LIQUID | 85.87 lbs |

| VITAMIN PREMIX COMPOSITION: | | | |
|---|---|---|---|
| VITAMIN | CONCENTRATION | AMOUNT | TOTAL PROVIDED |
| A | 650,000 IU/gm | 12.4 gm | 8,060,000 IU |
| D | 541,000 IU/gm | 1.0 gm | 541,000 IU |
| E | 500 IU/gm | 6.0 gm | 3,000 IU |
| Biotin | 98% purity | 0.016 gm | 0.01568 gm |
| Sodium Bicarbonate | 0 | 230.5840 gm | |
| TOTAL: | | 250 gm | |

While Applicant used the formulation described above in one embodiment, the invention claimed herein is not limited by this particular formulation.

Using the marinade formulation of the embodiment described above, strips of wet rawhide were combined with specified quantities of marinade solution and placed into a commercial vacuum tumbler, specifically a Hollymatic model HVTS200. Hollymatic Corporation, 600 E. Plainfield Road, Countryside, Ill. 60525, manufactures several modes of vacuum tumblers for processing foods. Also see, for example, U.S. Pat. Nos. 5,158,794, 5,004,618 and 5,084,286. Other machines for applying vacuum pressure to the combination of wet rawhide and marinade are believed to be interchangeable with that described herein.

Three experimental runs of various ratios of wet rawhide to marinade were conducted to determine the absorption of marinade into the rawhide. For the Examples below, the vacuum was set for 22 in. Hg vac. and the combination was tumbled at 10 rotations per minute (rpm). The duration and ratios are provided in the table below. In all tests, substantially all the marinade was absorbed by the rawhide strips following the specified run time.

EXAMPLES

| TEST # | WET RAWHIDE | AMT. MARINADE | TUMBLE TIME |
|---|---|---|---|
| 1 | 25 lbs. | 8 lbs. | 10 min. |
| 2 | 25 lbs. | 8 lbs. | 10 min. |
| 3 | 25 lbs. | 7 lbs. | 5 min. |

It is believed that the amount of vacuum pressure, the tumbling speed, and the time that the wet rawhide is mixed with the marinade each contribute to the absorption of the marinade into the wet rawhide. For example, approximately the same ratio of marinade to rawhide may be absorbed by the rawhide under less vacuum pressure, but it may take longer for the rawhide to fully absorb the marinade. It is believed that any amount of vacuum pressure will affect the inventive process, although, in a preferred embodiment, a negative pressure between 5–25 in. Hg vac. was used.

After removal of the rawhide strips from the drum, the strips were set on racks to allow excess marinade to drain. After 5 hours, 10% of the absorbed marinade had drained from the rawhide. Then the rawhide strips were hand rolled into bone shapes and placed under moderate heat of approximately 135 degrees F. (or 52.7 degrees C.) for 4 days (or 96 hours) to dry. As stated above, in a preferred embodiment, the moisture content is lowered to less than approximately 12%.

Laboratory results indicated that vitamins contained in the premix were retained in the rawhide at the levels provided in the chart below even after the rawhide was dried using the above drying conditions. The concentration represent average units per kilogram of dried rawhide tested. The selection of the vitamins used in this trial was based on the ease of analysis, as well as the nutritional importance for the animal, but none of the nutrients are to limit the scope of the invention as set forth in the claims.

| | Concentration Levels Found in Dried Rawhide | | |
|---|---|---|---|
| | Test No. | | |
| Nutrient | 1 | 2 | 3 |
| Vitamin A | 187,500 IU/kg avg | 150,800 IU/kg avg | 82,180 IU/kg avg |
| Vitamin $D_3$ | 1,604 IU/kg avg | 2,974 IU/kg avg | 4,989 IU/kg avg |
| Vitamin B | 38.8 IU/kg avg | 36.2 IU/kg avg | 73.0 IU/kg avg |
| Biotin | 0.296 ppm | 0.321 ppm | 0.260 ppm |

In conclusion, it will be understood that the invention may be embodied in other specific forms without departing from the spirit or central characteristics thereof. The present example and embodiment, therefore, is to be considered in all respects as illustrative and not restrictive, and the invention is not to be limited to the details given herein. Modifications in the selection, design, and arrangement of the various components and steps discussed herein may be made without departing from the scope of the invention as set forth in the appended claims.

What is claimed is:

1. A process for producing a rawhide chew toy comprising:
   combining a marinade with wet rawhide;
   applying vacuum pressure to the marinade and the wet rawhide for a predetermined time to produce a marinated rawhide;
   releasing the vacuum pressure; and
   allowing the marinated rawhide to dry.

2. The process of claim 1, wherein the marinade and the wet rawhide are tumbled for a predetermined time during the step of applying vacuum pressure.

3. The process of claim 1, wherein the vacuum pressure applied to the marinade and the wet rawhide is between approximately 5 and approximately 25 in. Hg vac.

4. The process of claim 1, wherein the vacuum pressure applied to the marinade and the wet rawhide is approximately 22 in. Hg vac.

5. The process of claim 1, wherein the marinated rawhide is allowed to dry by applying heat at a temperature of approximately 135 degrees F. until less than approximately 12% moisture content remains in the rawhide.

6. The process of claim 1, wherein the wet rawhide is comprised of a strip.

7. The process of claim 6, wherein the marinated rawhide strip is formed into a desired shape before drying.

8. The process of claim 1, wherein the marinade comprises a nutrient.

9. The process of claim 8, wherein the nutrient includes a vitamin.

10. The process of claim 8, wherein the nutrient includes a mineral.

11. The process of claim 1, wherein the marinade comprises a dental additive.

12. The process of claim 1, wherein the marinade comprises an herbal remedy.

13. The process of claim 1, wherein the marinade comprises a spice.

14. The process of claim 1, wherein the marinade comprises a desired flavor.

15. A rawhide chew made according to the process of claim 1.

16. A rawhide chew made according to the process of claim 2.

17. A rawhide chew made according to the process of claim 3.

18. A rawhide chew made according to the process of claim 7.

19. A process for producing a rawhide chew toy comprising:
   combining a marinade with a wet rawhide strip;
   applying vacuum pressure of between approximately 5 and approximately 25 in. Hg vac. to the marinade and the wet rawhide strip for a predetermined time;
   tumbling the marinade and the wet rawhide strip for a predetermined time during the step of applying vacuum pressure to produce a marinated rawhide strip;
   releasing the vacuum pressure;
   forming the marinated rawhide strip into a shaped strip; and
   allowing the shaped strip to dry by applying heat at a temperature of approximately 135 degrees F. until less than approximately 12% moisture content remains in the shaped rawhide strip.

20. A rawhide chew made according to the process of claim 19.

* * * * *